United States Patent
Jones et al.

(10) Patent No.: US 11,835,169 B2
(45) Date of Patent: Dec. 5, 2023

(54) EXTERIOR CLADDING FOR INSULATION SYSTEMS

(71) Applicant: JOHNS MANVILLE, Denver, CO (US)

(72) Inventors: Marybeth Jones, Littleton, CO (US); Ames Kulprathipanja, Broomfield, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/533,477

(22) Filed: Nov. 23, 2021

(65) Prior Publication Data

US 2023/0160519 A1    May 25, 2023

(51) Int. Cl.
*F16L 57/00* (2006.01)
*F16L 59/10* (2006.01)

(52) U.S. Cl.
CPC ..................... *F16L 59/10* (2013.01)

(58) Field of Classification Search
CPC ...................................... F16L 59/10
USPC ................. 138/110, 149, 121, 122
See application file for complete search history.

(56) References Cited

U.S. PATENT DOCUMENTS

| | | | |
|---|---|---|---|
| 2,330,966 A * | 10/1943 | Gottwald | F16L 59/166 138/172 |
| 2,410,308 A * | 10/1946 | Scharwath | F16L 59/12 138/149 |
| 3,240,234 A | 3/1966 | Bond, Jr. et al. | |
| 3,272,912 A | 9/1966 | Jachimowicz | |
| 3,581,776 A * | 6/1971 | Sheahan | F16L 59/022 138/108 |
| 3,582,536 A * | 6/1971 | Miller | H01B 11/1839 138/121 |
| 4,700,751 A * | 10/1987 | Fedrick | F16L 59/06 138/104 |
| 4,909,282 A * | 3/1990 | Staugaard | F16L 59/022 138/144 |
| 4,984,605 A * | 1/1991 | Schippl | F16L 59/08 138/148 |
| 4,998,597 A * | 3/1991 | Bainbridge | F16L 59/21 181/243 |
| 7,308,803 B2 | 12/2007 | Brokaw et al. | |
| 2010/0035078 A1 * | 2/2010 | Staudt | B32B 5/022 428/596 |

(Continued)

FOREIGN PATENT DOCUMENTS

| | | |
|---|---|---|
| CN | 106 439 277 A | 2/2017 |
| EP | 3 872 382 A1 | 9/2021 |
| WO | 2019160909 A1 | 8/2019 |

*Primary Examiner* — James F Hook
(74) *Attorney, Agent, or Firm* — Robert D. Touslee

(57) ABSTRACT

Some embodiments of the present technology may encompass pipe insulation systems. The insulation systems may include an insulation member having an inner surface and an outer surface. The insulation systems may include a protective cladding having an interior surface and an exterior surface. The interior surface of the protective cladding may be disposed about the outer surface of the insulation member. The interior surface of the protective cladding may include an embossed texture formed from a plurality of protruding features and a plurality of recessed features. The plurality of protruding features may extend at least 1 mm beyond the plurality of recessed features.

20 Claims, 10 Drawing Sheets

(56) References Cited

U.S. PATENT DOCUMENTS

| | | | |
|---|---|---|---|
| 2010/0108169 A1* | 5/2010 | Frohne | F16L 11/15 |
| | | | 138/108 |
| 2010/0170590 A1* | 7/2010 | Juuti | B29C 44/3496 |
| | | | 156/194 |
| 2014/0215962 A1 | 8/2014 | Wang | |
| 2021/0170713 A1 | 6/2021 | Baldwin | |

* cited by examiner

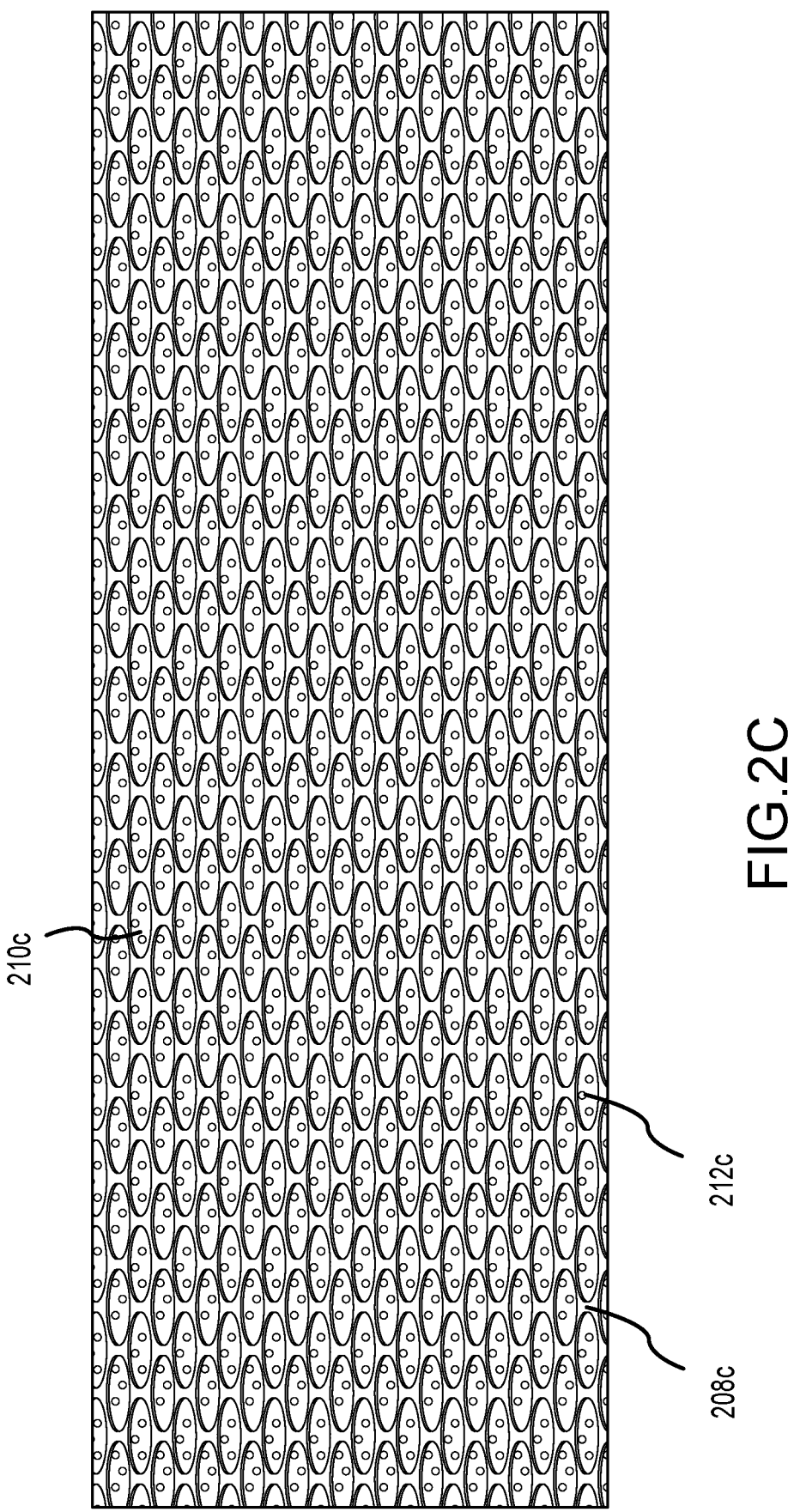

EXTERIOR CLADDING FOR INSULATION SYSTEMS

BACKGROUND

In many industries, it is commonplace to provide thermal insulation systems for pipe and equipment to prevent heat loss or gain. When insulation materials on pipes and equipment are exposed to the external environment, the insulation material can become wet and may lead to physical deterioration of the equipment, loss of thermal efficiency, and corrosion of the pipe or piece of equipment being insulated. Therefore, an additional outer layer, commonly called a protective jacketing or cladding, is often installed over the insulation material to provide the insulation material with weather protection and protection from physical impacts. Damage to the cladding may result in the ingress of water into the insulation system, which may lead to corrosion under insulation (CUI). CUI is one of the largest issues plaguing the industrial insulation market. Corrosion of metal pipes leads to safety issues, process upsets, and high replacement costs. For example, pipe or equipment leakage, catastrophic damage caused by such leakage, significant operational downtime and high maintenance costs are all possible effects of CUI.

Therefore, improvements in cladding for insulation systems are desired.

SUMMARY

Some embodiments of the present technology may encompass pipe insulation systems. The insulation systems may include an insulation member having an inner surface and an outer surface. The insulation systems may include a protective cladding having an interior surface and an exterior surface. The interior surface of the protective cladding may be disposed about the outer surface of the insulation member. The interior surface of the protective cladding may include an embossed texture formed from a plurality of protruding features and a plurality of recessed features. The plurality of protruding features may extend at least 1 mm beyond the plurality of recessed features.

In some embodiments, the interior surface of the protective cladding may be positioned directly against the outer surface of the insulation member. At least 40% of the interior surface of the protective cladding may include the plurality of recessed features. The exterior surface of the cladding may form an outermost surface of the pipe insulation system. The inner surface of the insulation member may be disposed about an outer surface of a pipe or vessel. The embossed texture may permit cross-direction flow of liquid. The protective cladding may include a drainage port.

Some embodiments of the present technology may encompass protective claddings. The claddings may include a cladding body having an interior surface and an exterior surface. The interior surface of the cladding body may include an embossed texture formed from a plurality of protruding features and a plurality of recessed features. At least 40% of the interior surface of the protective cladding may include the plurality of recessed features. The plurality of protruding features may extend at least 1 mm beyond the plurality of recessed features.

In some embodiments, the exterior surface of the cladding body may include the embossed texture. The embossed texture may include at least one texture selected from the group consisting of: a vertical corrugated pattern, a repeating oval pattern, a repeating circular pattern, a perforated pattern, a stucco pattern, and a weave pattern. The cladding body may include at least one material selected from the group consisting of aluminum, stainless steel, and polyvinyl chloride (PVC). The embossed texture may permit cross-direction flow of liquid. The plurality of protruding features may extend no more than 10 mm beyond the plurality of recessed features. The protective cladding may form an outermost layer of a pipe insulation system.

Some embodiments of the present technology may encompass methods of insulating of a pipe or vessel. The methods may include positioning an inner surface of an insulation member against an outer surface of a pipe or vessel. The methods may include positioning an interior surface of a protective cladding against an outer surface of the insulation member. The interior surface of the protective cladding may include an embossed texture formed from a plurality of protruding features and a plurality of recessed features. The plurality of protruding features may extend at least 1 mm beyond the plurality of recessed features. The methods may include securing ends of the protective cladding together.

In some embodiments, the methods may include forming a drainage port in a low region of the protective cladding. Securing ends of the protective cladding together may include overlapping a first end over a second end and securing the first end and the second end in an overlapped configuration. At least 40% of the interior surface of the protective cladding may include the plurality of recessed features. The embossed texture may permit cross-direction flow of liquid. The interior surface of the protective cladding may be positioned directly against the outer surface of the insulation member. An exterior surface of the cladding may form an outermost surface of a pipe insulation system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 2A-2E illustrate various embodiments of protective cladding according to some embodiments of the present invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to insulation systems that include protective jacketing or cladding that may be positioned against an outer surface of an insulation material fora pipe or vessel (or other equipment). An interior surface of the cladding may include an embossed texture that provides clearance for any water or other liquid present within the interior of the cladding to easily drain from the cladding. The embossed pattern may be sized and shaped to reduce drainage time and reduce the amount of liquid retained within the interior of the cladding. Drain ports may be included that enable any liquid flowing along the interior surface of the cladding to be removed from the insulation system.

Figure 1A:
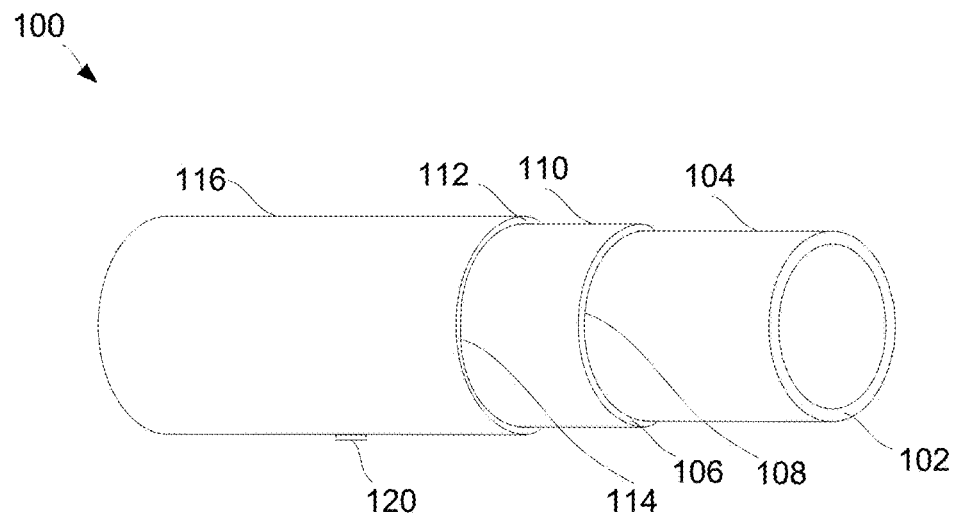
FIG. 1A illustrates an isometric view of an insulation system according to some embodiments of the present technology.
Figure 1B:
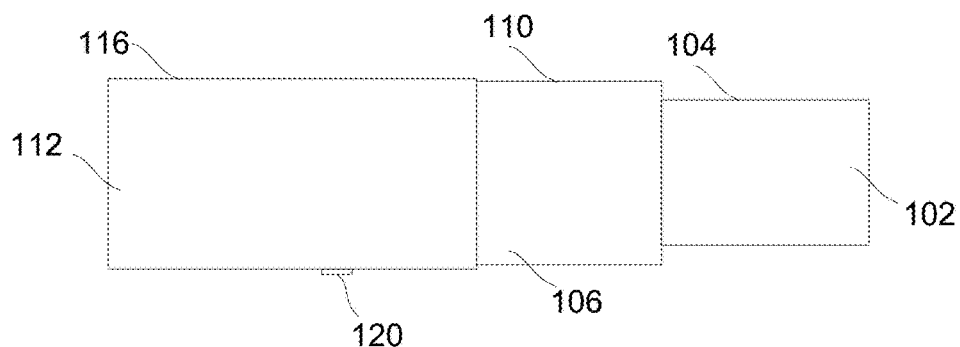
FIG. 1B illustrates a side elevation view of the insulation system of FIG. 1A.
Figure 1C:
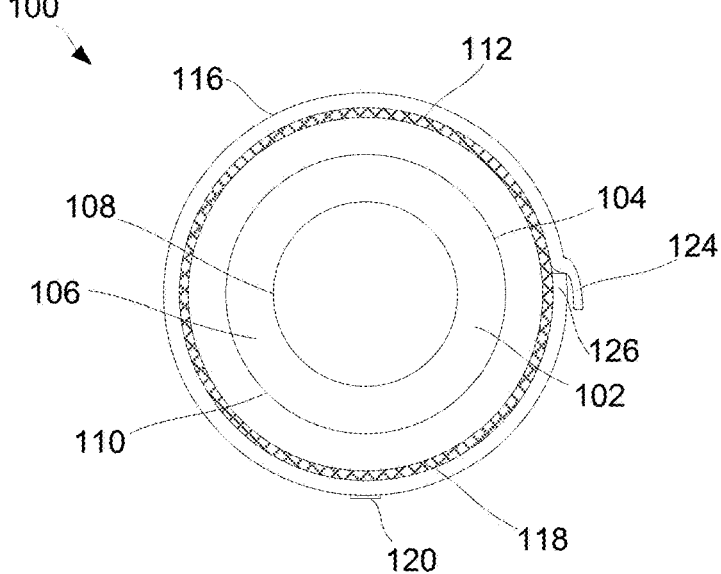
FIG. 1C illustrates a cross-sectional front elevation view of the insulation system of FIG. 1A.

Turning now to FIGS. 1A-1C, one example of an insulation system 100 is illustrated. Insulation system 100 may include a pipe, vessel, or other equipment to be insulated. For example, as illustrated the system 100 includes a cylindrical pipe 102 having an outer surface 104. System 100 may also include an arcuate insulation member 106 having an inner surface 108 and an outer surface 110. The inner surface 108 may be positioned against the outer surface 104 of the pipe 102. For example, in some embodiments the inner surface 108 of the insulation member 106 may be positioned directly adjacent the outer surface 104 of pipe 102, without any intervening layers. The insulation member 106 may include a single piece of material or may be formed from multiple pieces of material. For example, insulation member 106 may be a single piece of material that has a longitudinal slit that enables the insulation member 106 to be opened to be positioned about the pipe 102, and then closed about the pipe 102. In other embodiments, the insulation member 106 may include two or more arcuate pieces (of equal or different sizes) that may be joined to completely or substantially wrap about the pipe 102. Insulation member 106 may be formed to fit around objects of various cross-sections, such as rectangles, circles, ellipses, triangles, etc. In some embodiments, the insulation member 106 may be formed as an arcuate shape with or without kerfing. For example, the insulation member 106 may include one or more pieces that are provided in block (e.g., parallelogram) form. The insulation member 106 (or pieces thereof) may be rectangular in shape with a number of kerfs formed in inner surface 108. The insulation member 106 may then be formed to a desired shape, to form fit around the desired structure. For example, if the insulation member 106 is to surround a tubular structure (such as pipe 102), the kerfs on the inner surface 108 may be oriented to face toward the pipe 102 and will pinch closed as the insulation member 106 is curved around the pipe 102. The outer surface 110 of the insulation member 106 may provide an even, uniform, and flat surface for a protective jacketing or cladding 112 to be applied. In other embodiments, a multi-piece insulation member 106 may include a number of arcuate pieces of insulation material, which may be joined to substantially and/or fully surround the outer surface 104 of pipe 102.

Insulation member 106 may be provided in a number of thicknesses. For example, the thickness of the insulation member may range from between about 25 mm to about 152 mm, although other insulation thicknesses may be used in various embodiments to meet the needs of a particular insulation application. The insulation member 106 may include various insulation materials. For example, the insulation member may include expanded perlite insulation material, mineral fiber insulation, and/or other kinds of insulation material. The mineral fiber materials may include rock mineral wool, slag mineral wool, fiber glass based products, and/or combinations thereof.

As indicated above, the insulation system 100 may include a protective cladding 112 having an interior surface 114 and an exterior surface 116. The interior surface 114 of the cladding 112 may be positioned against the outer surface 110 of the insulation member 106. For example, in some embodiments the interior surface 114 of the cladding 112 may be positioned directly adjacent the outer surface 110 of the insulation member 106, without any intervening layers. In some embodiments, the exterior surface 116 may form an outermost surface of the insulation system 100. The cladding 112 may be formed from various materials, such as sheet metal, plastic sheet, metal foil, and/or plastic laminates. For example, the cladding 112 may include aluminum, stainless steel, and/or polyvinyl chloride (PVC) in various embodiments. The cladding 112 may be formed from one or more pieces of material and may be positioned about all or substantially all of the periphery of the insulation member 106. For example, a single-piece cladding 112 may include a first end 124 and a second end 126. The first end 124 may be overlapped over the second end 126, with the ends secured together (such as by using tape, adhesives, wire, bands, and/or other securement mechanism) to completely extend about and seal the insulation system 100. In some embodiments, a sealant, such as epoxy and/or caulk, may be provided at the interface between the first end 124 and the second end 126 to ensure that the protective cladding 112 is fully sealed. In other embodiments, the cladding 112 may be provided as multiple arcuate pieces of material that may be coupled together to be positioned about all or substantially all of the periphery of the insulation member 106. For example, ends of each piece of cladding material may be secured together in an overlapping fashion as described above to completely extend about and seal the insulation system 100.

When installed about a pipe 102 and insulation member 106, the cladding 112 may include a drainage port 120 (as best shown in FIG. 1B), which may provide a location for any water or other fluid to be drained and/or otherwise removed from the insulation system 100. For example, during installation, the drainage port 120 may be cut and/or otherwise formed in a bottom region of the cladding 112, such as in a low area of the insulation system 100. The drainage port 120 may include a stopper, such as a sealing cap, which may be used to seal the insulation system 100 when the insulation system 100 is not being drained.

As will be discussed in greater detail below, the interior surface 114 (and possibly exterior surface 116) of the cladding 112 may include an embossed texture 118. The embossed texture 118 may be formed from and/or otherwise include a number of protruding features and a number of recessed features. A depth of a lowest point of the recessed features relative to a peak of the protruding features (or other relative distance between such points) may provide clearance for any water or other fluid within an interior of the cladding 112 to flow along the interior surface 114 for draining, such as via the drainage port 120.

FIGS. 2A-2E illustrate protective claddings 200 according to some embodiments of the present technology. The protective cladding 200 may be used as cladding 112 in insulation system 100, and may be understood to include any of the features described in relation to cladding 112. The cladding 200 may include a cladding body 202 that includes an interior surface 204 and an exterior surface 206. The interior surface 204 may be positioned against an insulation member, such as insulation member 106 and the exterior surface 206 may form an outer (or outermost) surface of an insulation system. The cladding body 20 may have a thickness of between about 0.5 mm to 10 mm. In some embodiments, the interior surface 204 may include a moisture barrier, such as a polymeric sheet and/or coating.

The interior surface 204 (and possible the exterior surface 206) may include an embossed texture formed from a plurality of protruding features 208 and a plurality of recessed features 210. In some embodiments, the protruding features 208 and recessed features 210 may be arranged about the interior surface 204 (and possibly the exterior surface 206) in a repeating pattern, with the protruding features 208 and recessed features 210 being uniformly distributed about the interior surface 204 (and possibly the exterior surface 206). In other embodiments, the protruding features 208 and/or recessed features 210 may be randomly distributed about the interior surface 204 (and possible the exterior surface 206). The arrangement of protruding features 208 and recessed features 210 may permit water to more readily drain along the interior surface 204 of the cladding 200. For example, the arrangement of protruding features 208 and recessed features 210 may enable flow along a length of the cladding 200 and/or along the cross-direction (e.g., about the circumference of the interior surface 204).

In some embodiments, to promote drainage of fluid, at least 40% of the interior surface 204 may include the recessed features 210 and/or other open area. For example, between about 40% and 90% of the interior surface 204 may include recessed features 210, between about 45% and 80% may include recessed features 210, between about 50% and 70% may include recessed features 210, or between about 55% and 60% may include recessed features 210. In some embodiments, at least 10% of the interior surface 204 may include the protruding features 208. For example, between about 10% and 60% of the interior surface 204 may include the protruding features 208, between about 20% and 55% may include the protruding features 208, between about 30% and 50% may include the protruding features 208, or between about 40% and 45% may include the protruding features 208. At least some of the protruding features 208 may extend at least 1 mm beyond a lowest depth of at least some of the recessed features 210. For example, the protruding features 208 may extend between 1 mm and 10 mm beyond the recessed features 210, between 1.25 mm and 8 mm, between 1.5 mm and 6 mm, between 1.75 mm and 4 mm, or between 2 mm and 3 mm. The distance may be measured from a highest point of a protruding feature 208 and a lowest point of a recessed feature 210 proximate the protruding feature 208. In some embodiments, each of the protruding features 208 may have a same size (e.g., protrusion distance, shape, area, etc.), while in other embodiments some or all of the protruding features 208 may have different sizes. Similarly, each of the recessed features 210 may have a same size (e.g., recessed depth, shape, area, etc.) and/or may have different sizes. Some or all of the protruding features 208 and recessed features 210 may have the same or different size. By utilizing an arrangement of protruding features 208 and recessed features 210 in which at least some of the protruding features 208 extend at least 1 mm beyond the recessed features 210 with at least 40% of the interior surface 204 including recessed features 210, embodiments of the present technology may enable fluid to quickly drain from the interior of the cladding 200 while also reducing an amount of residual fluid within the cladding 200 and/or insulation system.

Figure 2A:
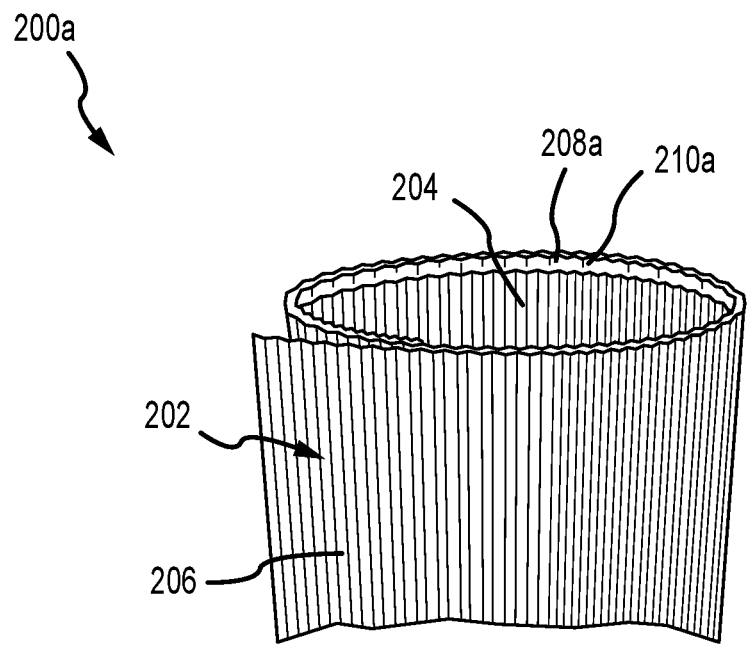

The embossed texture (including protruding features 208 and recessed features 210) may take various forms. For example, as shown in FIG. 2A, the embossed texture may be a corrugated texture that includes an undulating pattern of protruding features 208a and recessed features 210a. For example, the protruding features 208a may include ridges or crests, while the recessed features 210a may include grooves or troughs. The protruding features 208a and recessed features 210a may be arranged such that the crests and troughs extend along a length of the cladding 200a, which may enable the troughs to serve as conduits for fluid to flow along the length of the cladding 200a toward a drainage port.

Figure 2B:
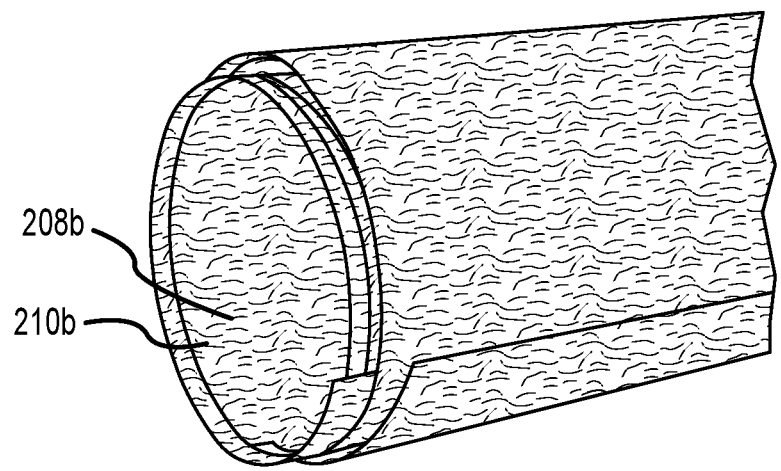

As illustrated in FIG. 2B, the embossed texture may be a stucco pattern that includes a random pattern of protruding features 208b and recessed features 210b. For example, the stucco pattern may include a dash pattern (e.g., fine dash, heavy dash, knockdown dash, etc.) that includes a mix of high regions (e.g., protruding features 208b) and lower regions (e.g., recessed features 210b). The high regions and low regions may have random shapes and sizes, with the height/depth transitions between the regions being variable in some embodiments. As indicated above, the highest points of at least some of the protruding features 210b may extend at least 1 mm from a lowest point of at least some of the recessed features 210a.

As illustrated in FIG. 2C, the embossed texture may be a pattern that includes repeating shapes, such as ovals, circles, and/or other shapes. For example, the pattern may include repeating recessed features 210c having oval, circular, and/or other shapes, with protruding features 208c extending between and separating adjacent ones of the recessed features 210c. In some embodiments, the recessed features 210c may be provided in a number of rows and/or columns, with the recessed features 210c within each row being staggered and or aligned with recessed features 210c in adjacent columns and/or rows. As illustrated, a number of smaller depressions 212c may be provided within each recessed feature 210c. For example, as illustrated, each recessed feature 210c has an oval shape, while a number of smaller circular depressions 212c are provided within each recessed feature 210c. Each of the depressions 212c may have a greater depth than the respective recessed feature 210c. It will be appreciated that the number, size, and shape of depressions 212c may vary when present. In some embodiments, the protruding features 208c may include the repeating shapes, while the recessed features 210c extend between and separate adjacent ones of the protruding features 208c.

Figure 2D:
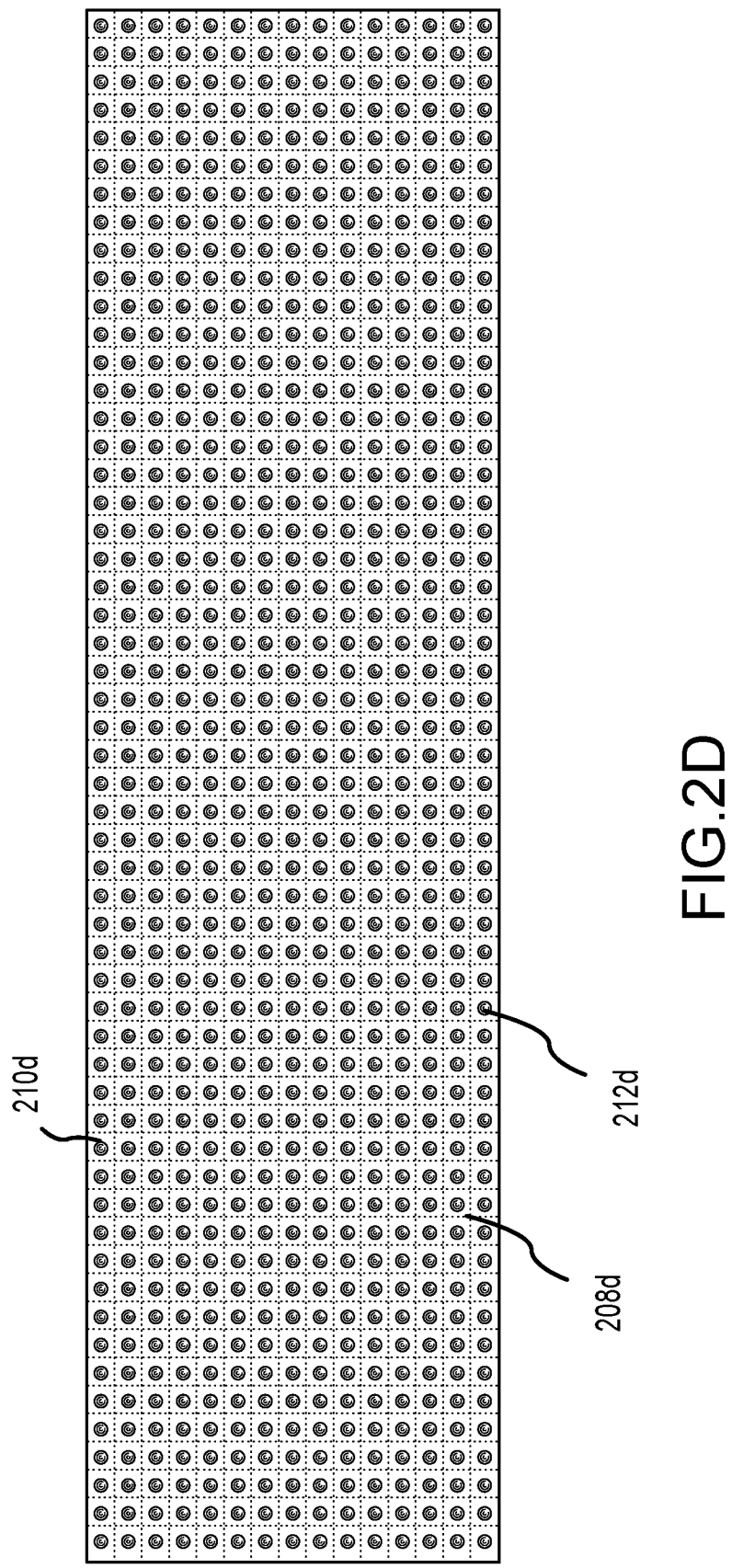

As illustrated in FIG. 2D, the embossed texture may be a pattern that includes a number of indentations or perforations arranged at regular and/or irregular intervals. The indentations (e.g., recessed features 210d) may be oval, circular, and/or other shapes, with protruding features 208d extending between and separating adjacent ones of the recessed features 210d. In some embodiments, the recessed features 210d may be provided in a number of rows and/or columns, with the recessed features 210d within each row being staggered and or aligned with recessed features 210d in adjacent columns and/or rows. As illustrated, a number of smaller depressions 212d may be provided between adjacent recessed features 210d. For example, as illustrated, each recessed feature 210d has circular shape, while a number of smaller circular depressions 2123 are provided between each adjacent recessed feature 210d. Each of the depressions 212d may have a lesser depth than the recessed features 210d. It will be appreciated that the number, size, and shape of depressions 212d may vary when present. In some embodiments, the perforations may extend between the protruding features 208d, which may be oval, circular, and/or other shapes, while the recessed features 210d extend between and separate adjacent ones of the protruding features 208d.

Figure 2E:
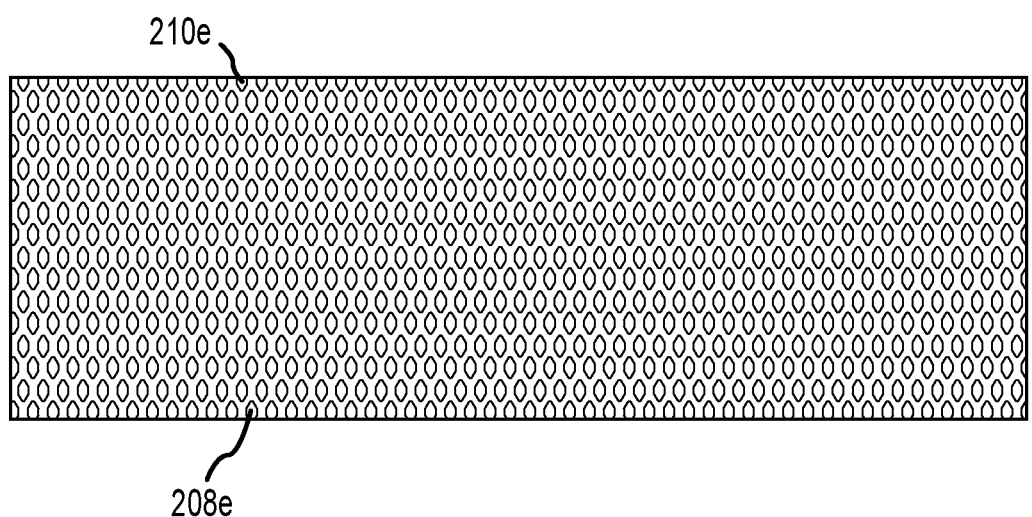

As illustrated in FIG. 2E, the embossed texture may be a weave pattern that includes a number of intersecting segments. As illustrated, the intersecting segments are generally coplanar and form the protruding features 208e. In such embodiments, the protruding features 208e may effectively be one continuous high surface, with a number of gaps formed therein. The gaps between the respective intersecting features may form recessed features 210e, which may be generally diamond shaped, with the shape being defined by sides of the intersecting segments. In some embodiments, the intersecting segments may form the recessed features 210e, with the gaps forming the protruding features 208e such that the recessed features 210e form a generally continuous low area.

While shown as being generally cylindrical in shape, it will be appreciated that the protective claddings describe herein may be formed into other shapes to meet the needs of a particular application. For example, the claddings may have non-circular cross-sectional shapes to fit pipes, vessels, and/or other equipment that do not have cylindrical and/or arcuate exterior surfaces. Additionally, the claddings may be formed into elbow joins and/or other fittings to accommodate various piping and/or vessel components.

Figure 3:
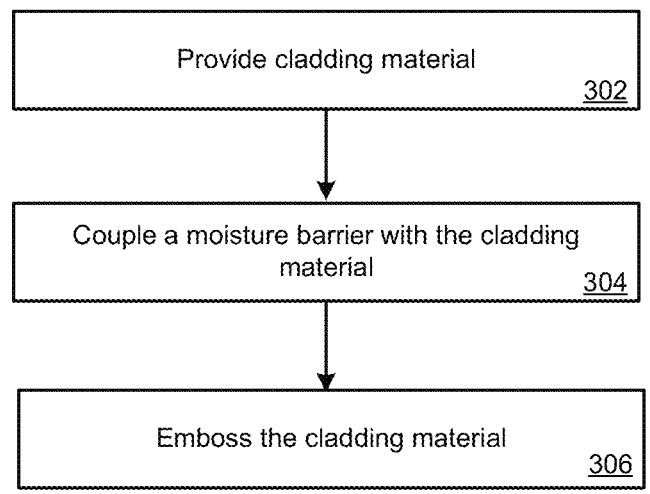
FIG. 3 illustrates a flowchart of a process for manufacturing a protective cladding according to some embodiments of the present technology.

FIG. 3 is a flowchart illustrating a process 300 for manufacturing a protective cladding according to some embodiments of the present invention. Process 300 may be used to produce a protective cladding, such as cladding 112 or 200 described above. Process 300 may begin at operation 302 by providing a sheet and/or roll of cladding material, such as aluminum or stainless steel. The cladding material may be provided in an industrial size, which may be later cut down and/or otherwise formed into smaller materials for installation applications. At operation 304, an inner surface of the cladding material may be coupled with a moisture barrier, such as a polymeric moisture barrier. In some embodiments, the moisture barrier may be laminated, sprayed, rolled, adhered, and/or otherwise applied to the inner surface of the cladding material. The cladding material may be embossed with a texture at operation 306. In some embodiments, the embossing may be done using a planar stamp. For example, the stamp may include an embossing texture (such as a vertical corrugated pattern, a repeating oval pattern, a repeating circular pattern, a perforated pattern, a stucco pattern, and/or a weave pattern) formed into a stamping surface. The stamp may be pressed against the interior surface of the cladding material to form the embossed texture on the interior surface (and possibly exterior surface) of the cladding material. In other embodiments, a roller assembly may be used to impart the embossed texture onto the cladding material. For example, the cladding material may be passed through one or more rollers, with at least one of the rolling including the embossing texture. The one or more rollers may apply pressure to the cladding material that causes the embossed texture to be imparted on the interior surface (and possibly the exterior surface) of the cladding material.

Upon embossing the cladding material, one or more finishing operations may be performed. For example, the cladding material may be trimmed and/or otherwise formed into claddings of a desired size. In some embodiments, the cladding material may be rolled (or re-rolled) to coils of a desired diameter. The cladding material may be cut, pressed, molded, and/or otherwise formed into cladding for elbow joints, fittings, and/or other non-cylindrical shapes.

Figure 4:
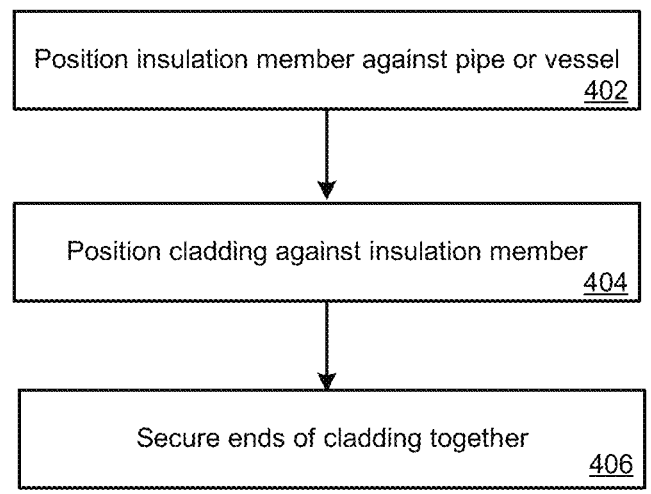
FIG. 4 illustrates a flowchart of a process for insulating a pipe according to some embodiments of the present technology.

FIG. 4 is a flowchart illustrating a process 400 for insulating of a pipe or vessel according to embodiments of the present invention. Process 400 may include installing an insulation system (such as insulation system 100) that may include a protective cladding (such as cladding 112 or 200). Process 400 may begin at operation 402 by positioning an inner surface of an arcuate insulation member against an outer surface of a pipe or vessel. In some embodiments, the insulation member may be positioned directly against the outer surface of the pipe or vessel without any intervening layers. The process 400 may include positioning an interior surface of a protective cladding against an outer surface of the arcuate insulation member at operation 404. In some embodiments, the interior surface of the protective cladding may be positioned directly against the outer surface of the arcuate insulation member without any intervening layers. In some embodiments, an exterior surface of the cladding may form an outermost surface of a pipe insulation system.

The interior surface of the protective cladding may include an embossed texture formed from a plurality of protruding features and a plurality of recessed features. At least some of the protruding features extend at least 1 mm beyond at least some of the recessed features, which may provide clearance between the outer surface of the insulation member and the interior surface of the protective cladding. This clearance may provide a passageway for water and/or other fluid to be drained from the interior of the insulation system. In some embodiments, at least 40% of the interior surface of the protective cladding may include recessed features, which may ensure that sufficient clearance is provided to facilitate quicker and more complete draining of fluids from within the insulation system. In some embodiments, the embossed texture may permit cross-direction flow of liquid (e.g., flow along a circumference of the protective cladding). This may help better facilitate draining of fluid from all regions of the insulation system.

At operation 406, ends of the protective cladding may be secured together. For example, the protective cladding may be provided as a single piece of material or multiple pieces of material. Opposing ends of the single piece of material (or abutting ends of adjacent pieces of material) may be overlapped and secured together. In the case of a single piece protective cladding, a first end of the protective cladding may be overlapped with a second end and secured together in such an overlapped configuration such that the protective cladding completely surrounds the periphery of the insulation member. The ends of the protective cladding may be secured together using banding, wires, tape, adhesives, and/or other securement techniques. In some embodiments, a sealing agent, such as epoxy or caulk, may be provided at the interface of the ends of the protective cladding to help seal the protective cladding to prevent water ingress.

In some embodiments, the process 300 may include forming one or more drainage ports low regions of the protective cladding. For example, an installer may identify one or more low regions within the protective cladding along the length of the pipe or other vessel. At the low regions, a drainage port may be cut, drilled, and/or otherwise formed in a bottom surface of the protective cladding. The drainage ports may serve as ejection openings through which any liquid present within the insulation system may be removed. In some embodiments, the drainage ports may include stoppers that may be used to seal the interior of the protective cladding when the drainage ports are not actively being used to drain fluids from the insulation system.

EXAMPLES

Figure 5:
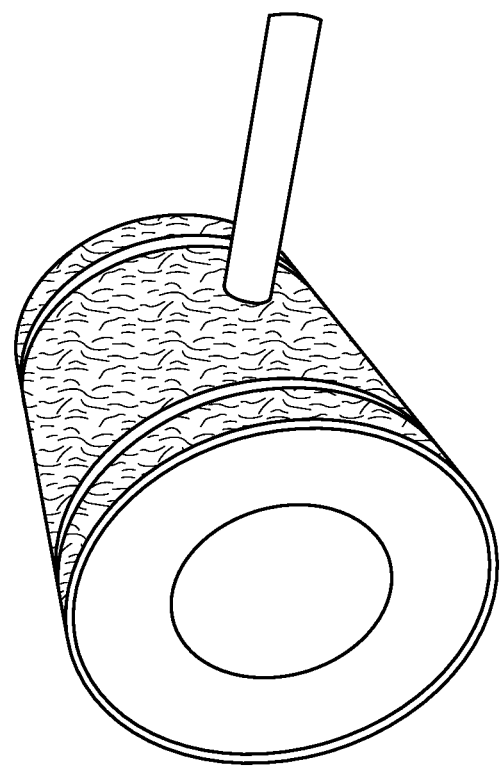
FIG. 5 illustrates a drainage testing setup for an insulation system.

A number of protective claddings with different embossed textures were tested to determine drainage rates with the various textures. Each protective cladding was positioned around an insulation member (such as shown in FIGS. 1A-1C) and a volume of water was added to the system via a tube that was inserted through a top side of the protective cladding as shown in FIG. 5. Times for the tube to drain and for the cladding and insulation system to drain were tracked, along with an amount of liquid retained within the system. This data is shown in Table 1 below.

TABLE 1

| Cladding Configuration | Tube Drain Time (minutes) | System Drain Time (minutes) | Liquid Retained (%) |
|---|---|---|---|
| Low depth (horizontal) corrugated | 8.50 | 16.00 | 28 |
| Medium depth (horizontal) corrugated | 3.00 | 6.00 | 32 |
| High depth (horizontal) corrugated | 6.00 | 15.00 | 33 |
| Medium depth (vertical) corrugated | 0.50 | 1.00 | 12 |
| Low depth stucco | 7.00 | 11.00 | 17 |
| Medium depth stucco | 5.50 | 9.75 | 26 |
| High depth stucco | 1.67 | 4.50 | 27 |
| Flat | 11.33 | 15.00 | 15 |

As shown above, higher embossing (stucco) and corrugation depths result in faster drainage times, but also tend to retain water within the system. Flat claddings provide good drainage, but very slow drainage times. The vertical corrugated cladding provided the best results, with a fast drainage time and low water retention.

Figure 6:
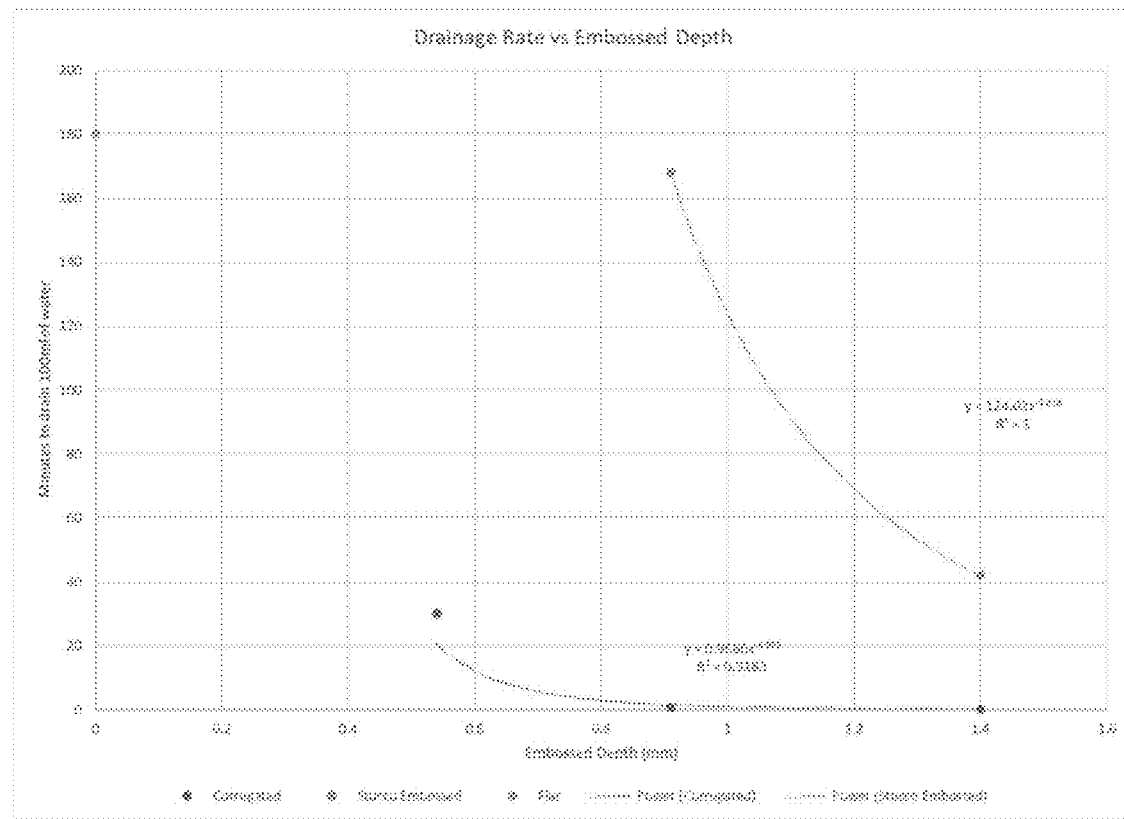
FIG. 6 illustrates a graph showing drainage rates of protective claddings with different embossing depths.

Several depths of embossing for the stucco and vertical corrugated claddings were performed, with the time needed to drain 100 ml of water from the system being plotted in FIG. 6. As illustrated, there are diminishing returns on drainage rate with increased depths of corrugations, with embossing depths of above about 0.9 or 1.0 mm providing the best drainage rates. Similarly, the stucco claddings with embossing depths of greater than about 1.0 or 1.2 mm exhibited improved drainage rates.

Testing was also performed to determine the effect of open area (e.g., area covered by recessed features) on drainage rates. A fixed volume of 100 ml of water was introduced into the system and a drainage time was monitored. Various embossing textures were tested as shown in Table 2 below.

| Embossing Texture | Time (sec) |
|---|---|
| Expanded Metal/Corrugated (wide) | 7 |
| Expanded Metal/Corrugated (narrow) | 7 |
| Oval (66% open area) | 7 |
| Weave (53% open area) | 7 |
| Circle (44% open area) | 8 |
| Perforated Plate (40% open area) | 15 |
| Perforated Plate (30% open area) | 27 |
| Perforated Plate (20% open area) | 34 |

Figure 7:
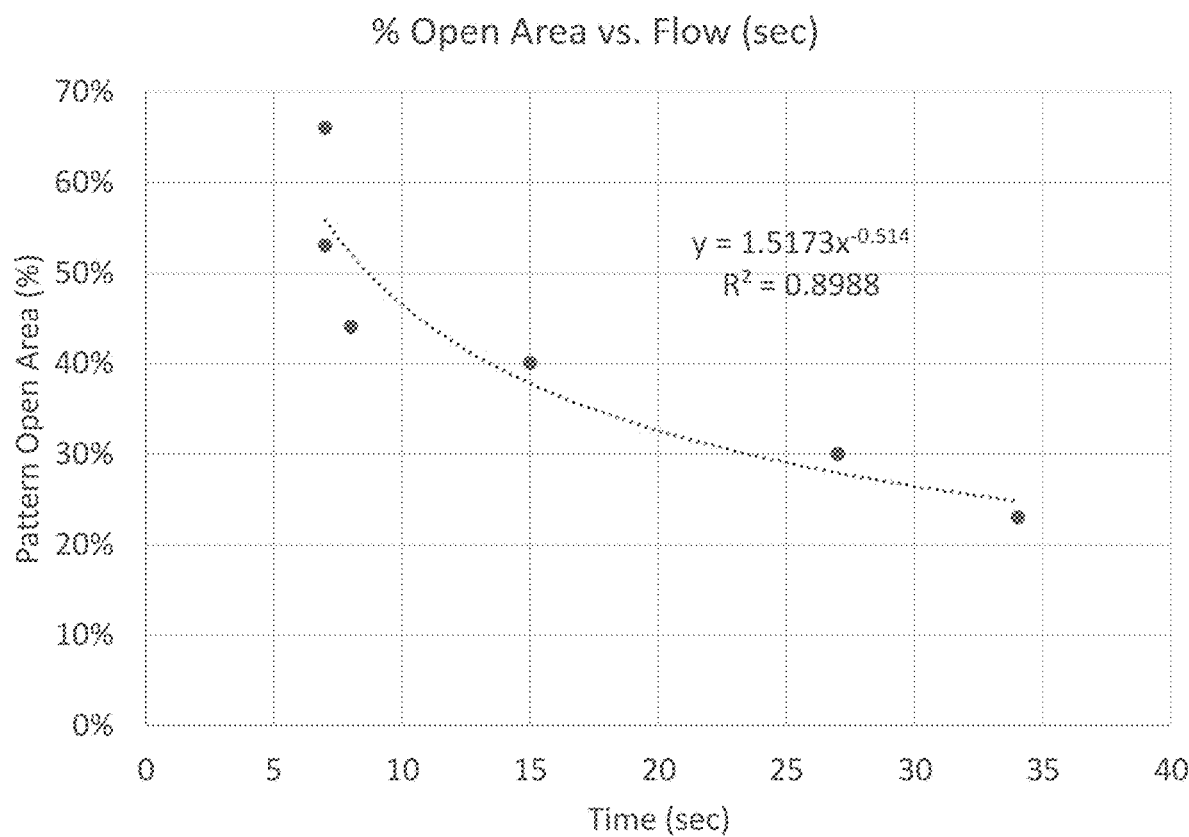
FIG. 7 illustrates a graph showing drainage rates of protective claddings with different open areas.

As shown in FIG. 7, open areas of greater than about 40% provided the quickest drainage times across all cladding types.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. It will be further appreciated that all testing methods described here may be based on the testing standards in use at the time of filing or those developed after filing.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A pipe insulation system, comprising:
   an insulation member having an inner surface and an outer surface; and
   a protective cladding having an interior surface and an exterior surface, wherein:
   the interior surface of the protective cladding is disposed about the outer surface of the insulation member;
   the interior surface of the protective cladding comprises an embossed texture formed from a plurality of protruding features and a plurality of recessed features; and
   the plurality of protruding features extend at least 1 mm beyond the plurality of recessed features.

2. The pipe insulation system of claim 1, wherein:
   the interior surface of the protective cladding is positioned directly against the outer surface of the insulation member.

3. The pipe insulation system of claim 1, wherein:
   at least 40% of the interior surface of the protective cladding comprises the plurality of recessed features.

4. The pipe insulation system of claim 1, wherein:
   the exterior surface of the cladding forms an outermost surface of the pipe insulation system.

5. The pipe insulation system of claim 1, wherein:
   the inner surface of the insulation member is disposed about an outer surface of a pipe or vessel.

6. The pipe insulation system of claim 1, wherein:
   the embossed texture permits cross-direction flow of liquid.

7. The pipe insulation system of claim 1, wherein:
   the protective cladding comprises a drainage port.

8. A protective cladding, comprising:
   a cladding body having an interior surface and an exterior surface, wherein:
   the interior surface of the cladding body comprises an embossed texture formed from a plurality of protruding features and a plurality of recessed features;
   at least 40% of the interior surface of the protective cladding comprises the plurality of recessed features; and
   the plurality of protruding features extend at least 1 mm beyond the plurality of recessed features.

9. The protective cladding of claim 8, wherein:
   the exterior surface of the cladding body comprises the embossed texture.

10. The protective cladding of claim 8, wherein:
    the embossed texture comprises at least one texture selected from the group consisting of: a vertical corrugated pattern, a repeating oval pattern, a repeating circular pattern, a perforated pattern, a stucco pattern, and a weave pattern.

11. The protective cladding of claim 8, wherein:
    the cladding body comprises at least one material selected from the group consisting of aluminum, stainless steel, and polyvinyl chloride (PVC).

12. The protective cladding of claim 8, wherein:
    the embossed texture permits cross-direction flow of liquid.

13. The protective cladding of claim 8, wherein:
    the plurality of protruding features extend no more than 10 mm beyond the plurality of recessed features.

14. The protective cladding of claim 8, wherein:
    the protective cladding forms an outermost layer of a pipe insulation system.

15. A method of insulating of a pipe or vessel, comprising:
    positioning an inner surface of an insulation member against an outer surface of a pipe or vessel;
    positioning an interior surface of a protective cladding against an outer surface of the insulation member, wherein:
    the interior surface of the protective cladding comprises an embossed texture formed from a plurality of protruding features and a plurality of recessed features; and
    the plurality of protruding features extend at least 1 mm beyond the plurality of recessed features; and
    securing ends of the protective cladding together.

16. The method of insulating a pipe or vessel of claim 15, further comprising:
    forming a drainage port in a low region of the protective cladding.

17. The method of insulating a pipe or vessel of claim 15, wherein:
    securing ends of the protective cladding together comprises overlapping a first end over a second end and securing the first end and the second end in an overlapped configuration.

18. The method of insulating a pipe or vessel of claim 15, wherein:
    at least 40% of the interior surface of the protective cladding comprises the plurality of recessed features.

19. The method of insulating a pipe or vessel of claim 15, wherein:
    the embossed texture permits cross-direction flow of liquid.

20. The method of insulating a pipe or vessel of claim 15, wherein:

the interior surface of the protective cladding is positioned directly against the outer surface of the insulation member; and an exterior surface of the cladding forms an outermost surface of a pipe insulation system.

\* \* \* \* \*